United States Patent
Asakura et al.

(10) Patent No.: US 8,255,116 B2
(45) Date of Patent: Aug. 28, 2012

(54) VEHICLE CONTROL DEVICE

(75) Inventors: Suguru Asakura, Wako (JP); Shinichi Arie, Wako (JP); Katsuyasu Yamane, Wako (JP); Masahiko Asakura, Wako (JP); Shinichi Ueda, Wako (JP); Akira Kamikura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 560 days.

(21) Appl. No.: 12/449,041

(22) PCT Filed: Feb. 15, 2008

(86) PCT No.: PCT/JP2008/052499
§ 371 (c)(1),
(2), (4) Date: Jul. 21, 2009

(87) PCT Pub. No.: WO2008/117583
PCT Pub. Date: Oct. 2, 2008

(65) Prior Publication Data
US 2010/0017056 A1    Jan. 21, 2010

(30) Foreign Application Priority Data
Mar. 26, 2007 (JP) .................................. 2007-079588

(51) Int. Cl.
*G06F 7/00* (2006.01)
(52) U.S. Cl. ........................................................ 701/36
(58) Field of Classification Search ................ 701/36; 307/9.1, 10.1, 10.3, 10.6; 340/1.1, 5.65, 340/426.3, 426.31; 324/378, 380
See application file for complete search history.

(56) References Cited

U.S. PATENT DOCUMENTS

| | | | |
|---|---|---|---|
| 6,260,651 B1 | 7/2001 | Kokubu et al. | |
| 6,418,533 B2 * | 7/2002 | Angelo et al. | 726/19 |
| 6,434,983 B1 | 8/2002 | Perillat et al. | |
| 7,145,264 B2 * | 12/2006 | Nagae et al. | 307/10.2 |
| 2001/0011942 A1 * | 8/2001 | Yamamoto et al. | 340/5.65 |

FOREIGN PATENT DOCUMENTS

| | | |
|---|---|---|
| DE | 33 18359 A1 | 11/1984 |
| DE | 100 34 350 A1 | 1/2002 |
| EP | 1 462 325 A2 | 9/2004 |
| JP | 10-167011 | 6/1998 |
| JP | 10-315914 | 12/1998 |
| JP | 2001-130381 | 5/2001 |
| JP | 2001-132289 | 5/2001 |
| JP | 2002-524681 | 8/2002 |
| JP | 2005-248902 | 9/2005 |
| JP | 2006-327420 | 12/2006 |
| WO | WO 0015476 A1 | 3/2000 |
| WO | 01/42599 A1 | 6/2001 |

* cited by examiner

*Primary Examiner* — Yonel Beaulieu
(74) *Attorney, Agent, or Firm* — Carrier Blackman & Associates, P.C.; Joseph P. Carrier; William D. Blackman

(57) ABSTRACT

A vehicle control device has a portable-unit restraining control unit which, when the portable unit is inserted in the slot in the drive-permitted state, irremovably fixed the portable unit, which is inserted in the slot, by the portable-unit restraining unit and, when the portable unit is inserted in the slot in the drive-prohibited state, releases the portable unit from the locking effected by the portable-unit restraining unit to allow removal of the portable unit from the slot.

11 Claims, 4 Drawing Sheets

VEHICLE CONTROL DEVICE

PRIORITY CLAIM

The present application is based on and claims the priority benefit of Japanese Patent Application 2007-079588 filed on Mar. 26, 2007, the contents of which are incorporated herein by reference in its entirety.

BACKGROUND OF THE INVENTION

1. Field of the Invention

The present invention relates to a vehicle control device mounted in a vehicle for enabling initiation of a driving source such as an engine according to authentication with a portable unit such as an electronic key.

2. Description of the Related Art

In recent years, a slot key has become popular in place of a mechanical key which is inserted into a key cylinder provided in an instrument panel of a vehicle and is turned to initiate an engine. After a user just inserts the slot key, such as an electronic key, into a slot, for example, provided in the instrument panel, or inserts the electronic key therein and simply presses a push button or the like, intercommunication between the electronic key and the vehicle is performed to authenticate the key, allowing the engine to be initiated or the like.

However, the device adopting the slot key is simply configured to have the electronic key inserted into the slot. Countermeasures are not made to prevent the electronic key from dropping out due to the rotations of the key cylinder when the vehicle is moving not like the mechanical key. In this regard, there has been known an art which adopts a key interlocking technology in the slot key device to prevent the electronic key from dropping out of the slot when the vehicle is moving. For example, there has been disclosed an art in which the key interlocking is fulfilled in conjunction with an electrical power supply from a device related to the initiation of the engine (for example, refer to Japanese Patent Laid-open No. 2005-248902, hereinafter referred to as Patent Document 1).

The slot key device disclosed in Patent Document 1 is provided with a solenoid configured to prevent the electronic key inserted in the slot from being removed when a key-insertion detection switch detects the electronic key has been inserted in the slot and a battery is supplying at least one of an ignition electrical power to an ignition device and an accessory electrical power to an accessory device. This slot key device supplies the electrical power to the solenoid via a diode in accordance with the electrical power supplied to the ignition device and the accessory device from at least the battery. Thereafter, in accordance with the electrical power supplied to the solenoid, a plunger protrudes into the slot and engages with an engagement recess provided in the electronic key to prevent the electronic key from being removed.

However, it is desired that the electronic key can be removed out only in such a situation that the vehicle is prohibited from driving (drive-prohibited state) in consideration of the fundamental purpose thereof. In this regard, the electrical power supplied to the ignition device and the accessory device may not appropriately match the situation. In other words, for example, the drive-prohibition of the vehicle is released when the engine is initiated; however, it is presumable that the electrical power may not have been supplied to either the ignition device or the accessory device. Therefore, for the device mentioned in Patent Document 1 in which the electronic key is locked in conjunction with the electrical power supplied to the ignition device and the accessory device, it is possible that the key is not locked in a situation where the key is desired to be locked.

Further, according to the device of Patent Document 1, it is configured that when the engine is initiated, for example, the electrical power supplied to the solenoid is defined in accordance with the electrical power supplied to the ignition device from a time when the ignition device is turned on to a time when the accessory device is turned on by the engine. Thereby, if a large amount of electrical power is supplied to a starter motor, for example, in addition to the ignition device when the battery is of low power, the electrical power supplied to the ignition device would be insufficient, and consequently, the electrical power supplied to the solenoid would be insufficient. In other words, even though the ignition device is turned on, the key cannot be prevented from being removed for sure. Thus, in the device disclosed in Patent Document 1, the electrical voltage varies due to the low power of the battery, which varies the condition preventing the electronic key from being removed. Thereby, it is possible that the electronic key is not locked in a situation where the electronic key is desired to be locked.

SUMMARY OF THE INVENTION

The present invention has been accomplished in view of the aforementioned problems, and it is therefore an object of the present invention to provide a vehicle control device which allows a stable control on locking a portable unit such as an electronic key in a slot and releasing the locking when the portable unit enabling an initiation of an engine or the like is inserted into the slot.

A vehicle control device provided according to the present invention having a slot provided in a vehicle where a portable unit is inserted and an initiation control unit which enables an initiation of a driving source provided in the vehicle when the portable unit is inserted in the slot, comprises: a drive permission unit which is provided in the vehicle and is configured to select between a drive-permitted state in which the drive of the vehicle is permitted and a drive-prohibited state in which the drive of the vehicle is prohibited according to a given condition; a drive state detection unit which is configured to sequentially detect which one of the drive-permitted state and the drive-prohibited state has been selected by the drive permission unit; a portable-unit restraining unit which is configured to unremovably restrain the portable unit inserted in the slot; and a portable-unit restraining control unit which is configured to unremovably lock the portable unit in the slot through the portable restraining unit if the portable unit is inserted in the slot in the drive-permitted state, and to release the portable unit locked in the slot by the portable restraining unit to allow the portable unit to be removed from the slot if the portable unit is inserted in the slot in the drive-prohibited state.

According to the vehicle control device of the present invention, a driver of the vehicle enables the driving source, such as an engine or a motor, ready for initiation by inserting the portable unit such as an electronic key into the slot under a given condition. On the other hand, the vehicle is generally provided with the drive permission unit to select between a drive-permitted state and a drive-prohibited state by locking or unlocking a steering wheel or a shift lever for the purpose of security, for example. Thereby, in the drive-permitted state allowed by the drive permission unit, it is highly possible that the vehicle is in move.

In this regard, the portable-unit restraining control unit unremovably restrains (locks) the portable unit inserted in the slot when the drive-permitted state is detected by the drive state detection unit. According thereto, the portable unit is locked when the vehicle is highly probable in move. Moreover, the portable-unit restraining control unit releases the locking of the portable unit, allowing the portable unit to be removed out from the slot when the drive-prohibited state is detected by the drive state detection unit. According thereto, the locking of the portable unit is released when the vehicle is not in move and it is highly probable for the driver to remove out the portable unit. Thereby, according to the present invention, the portable unit can be locked and released stably according to different situations.

In the vehicle control device of the present invention, it is desired that the drive permission unit is a steering lock unit configured to select between a locked state where the steering wheel of the vehicle is locked and an unlocked state where the steering wheel is unlocked; and the drive state detection unit is configured to detect the locked state selected by the steering lock unit as the drive-prohibited state and the unlocked state selected by the steering lock unit as the drive-permitted state.

In the vehicle control device of the present invention, it is desired that the drive permission unit is a shift lock unit configured to select between a locked state where the shift lever of the vehicle is locked and an unlocked state where the shift lever is unlocked; and the drive state detection unit is configured to detect the state where the shift lever is locked by the shift lock unit as the drive-prohibited state and the state where the shift lever is unlocked by the shift lock unit as the drive-permitted state.

Further, in the vehicle control device of the present invention, it is desired that the drive permission unit is a power steering unit configured to assist the steering wheel of the vehicle in steering or to apply a load to the steering wheel; and the drive state detection unit is configured to detect a locked state where the steering wheel is locked due to a load equal to or greater than a given value applied by the power steering unit as the drive-prohibited state and an unlocked state where the steering wheel is unlocked without the load equal to or greater than the given value applied by the power steering unit as the drive-permitted state.

In other words, when the steering lock unit is in the locked state, the shift lock unit is in the locked state and the steering wheel is in the locked state by the power steering unit, the steering wheel or the shift lever is locked, allowing no operation thereon. In this case, the vehicle is in the drive-prohibited state, the locking of the portable unit can be released by the portable-unit restraining unit, allowing the portable unit to be removed from the slot; thereby, the portable unit can be locked and released stably according to different situations.

Furthermore, in the vehicle control device of the present invention, it is desired that the drive permission unit converts a voltage supplied from a battery mounted in the vehicle into a given voltage and works at the given voltage.

In other words, the drive permission unit converts a voltage supplied from the battery mounted in the vehicle into a given voltage by means of a constant voltage circuit or the like, for example, and works at the converted voltage. According thereto, the drive-permitted state and the drive-prohibited state can be selected without being affected by the voltage variation or the like of the battery. Therefore, the portable-unit restraining control unit can stably lock the portable unit and release the locking thereof without being affected by the voltage variation or the like of the battery through the drive state detection unit to detect which state has been selected by the drive permission unit.

DETAILED DESCRIPTION OF THE PREFERRED EMBODIMENTS

Figure 1:
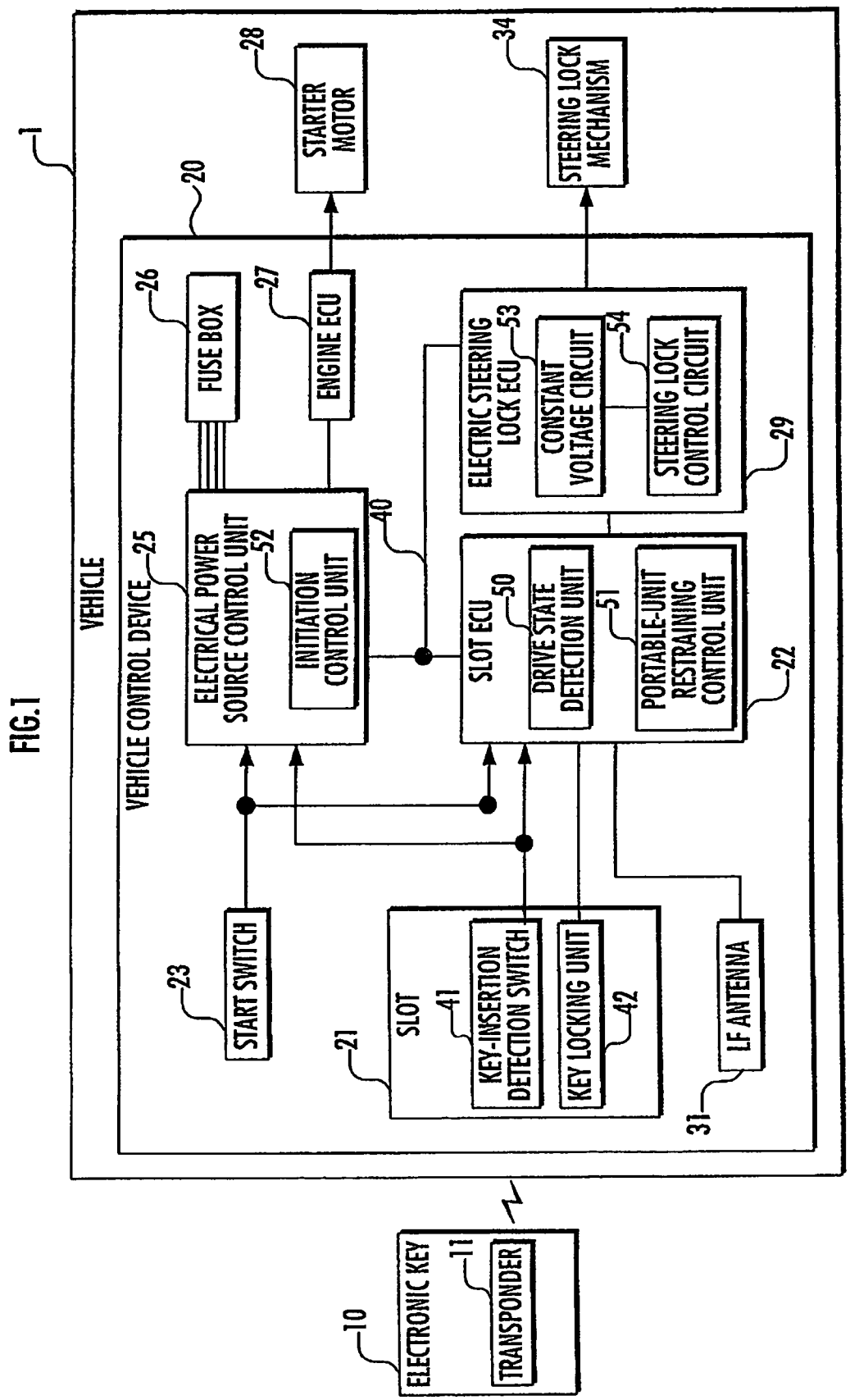
FIG. 1 is a structural diagram illustrating a vehicle control system having a vehicle control device according to an embodiment of the present invention.
Figure 2:
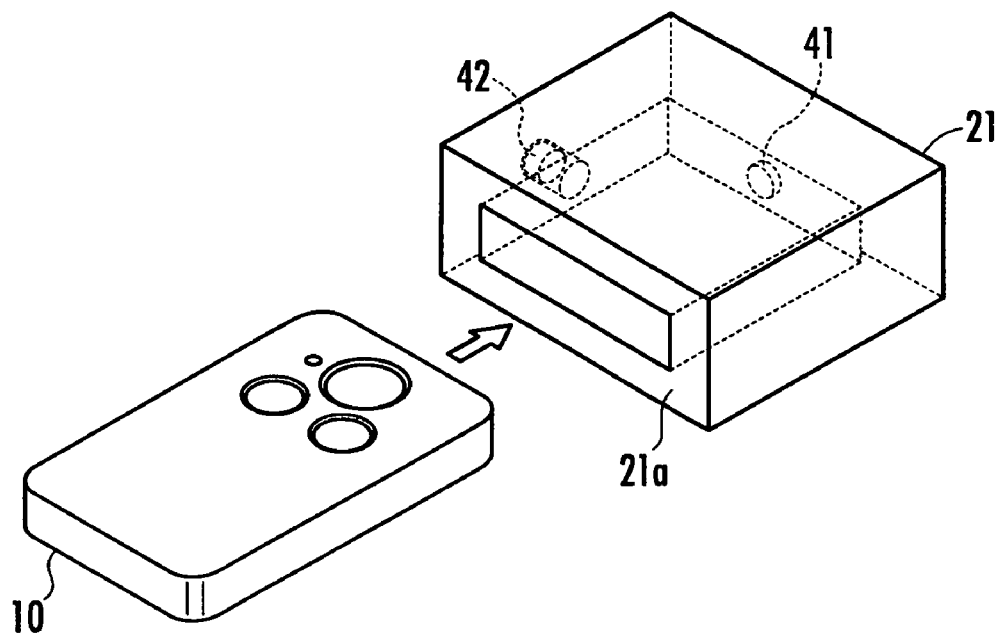
FIG. 2 is an explanatory diagram illustrating an electronic key and a slot provided in the vehicle control system illustrated in FIG. 1.
Figure 2:
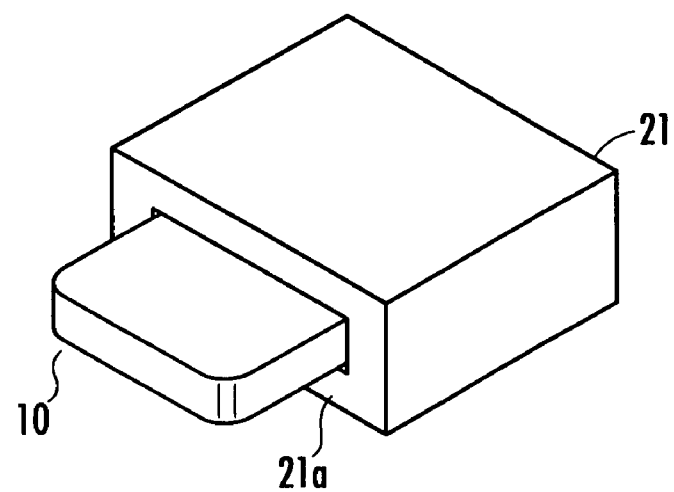

A vehicle control system comprising a vehicle control device according to an embodiment of the present invention will be described with reference to FIG. 1 to FIG. 5. As illustrated in FIG. 1, the vehicle control system is composed of an electronic key 10 which is given as an example of a portable unit of the present invention, and the vehicle control device 20 mounted in a vehicle 1. The vehicle control system authenticates whether or not the electronic key 10 has been pre-registered in the vehicle 1 through intercommunication with the electronic key 10, and initiates an engine or the like if the authentication of the electronic key 10 is valid.

The vehicle control device 20 includes a slot 21 where the electronic key 10 is inserted, a start switch 23, a slot ECU (electronic control unit) 22 configured to control the slot 21 and authenticate the electronic key 10 when inserted, a LF antenna 31 configured to perform wireless communication with the electronic key 10 in a LF (low frequency) band, an electric power control unit 25 for controlling electric power supply, a fuse box 26 connected to the electric power control unit 25, an electric steering lock (ESL) ECU 29 (corresponding to a drive permission unit of the present invention) which selectively locks or unlocks a steering wheel of the vehicle 1, and an engine ECU 27 for controlling the engine. The vehicle control device 20 is connected with a starter motor 28 for igniting the engine, and a steering lock mechanism 34 for locking the steering wheel. The above-mentioned components are connected through a communication line 40 and supplied with electric power from a battery (not shown) mounted in the vehicle 1.

As illustrated in FIG. 2(a), the electronic key 10 is a card-type one which is portable by a user of the vehicle 1 (driver) and can be inserted into or removed out of the slot 21. Further, as illustrated in FIG. 1, the electronic key 10 is built therein with a transponder 11 for intercommunicating with the vehicle control device 20. The transponder 11 receives a predefined driving radio wave sent from the LF antenna 31 and generates an electromotive force, thereafter, uses the generated electromotive force to transmit a respond signal containing a predefined recognition code to the LF antenna 31.

As illustrated in FIG. 2(a), the slot 21 has a cubic shape. A key inserting space for the electronic key 10 is formed inside the slot 21 with an opening at a side surface 21a thereof. The slot 21 is disposed at an instrument panel in the front of a vehicular compartment of the vehicle 1, neighboring the steering wheel, which can be operated by the driver. Specifically, the slot 21 is disposed in such a way that the side surface 21a is exposed out of the instrument panel and the electronic key 10 can be inserted therein or removed out thereof. FIG.

2(b) illustrates that the electronic key 10 has been inserted in the slot 21. A part of the electronic key 10 is left outside of the slot 21.

As illustrated in FIG. 1, the slot 21 is provided with a key-insertion detection switch 41 for detecting whether or not the electronic key 10 is inserted in the slot 21, and a key locking unit 42 (corresponding to a portable-unit restraining unit of the present invention) for locking the inserted electronic key 10 so as to prevent the electronic key 10 from dropping out of the slot 21.

The key-insertion detection switch 41 is a mechanical contact switch and is disposed inside the slot 21 with a movable part of the switch exposed outside. When the electronic key 10 is inserted into the slot 21, the movable part of the key-insertion detection switch 41 is pressed, the key-insertion detection switch 41 outputs a key-insertion detection signal to the electric power control unit 25 and the slot ECU 22.

The key locking unit 42 is composed of a plunger capable of protruding out and retrograding back inside the slot 21. A side surface of the electronic key 10 is formed with an engagement recess, and the plunger is disposed at a location opposite to the engagement recess when the electronic key 10 is inserted into the slot 21. When the plunger protrudes out, it engages with the engagement recess of the electronic key 10, locking the electronic key 10 in the slot 21 so that the electronic key 10 cannot be removed from the slot 21. Additionally, the key locking unit 42 is supplied with electric power from the battery mounted in the vehicle 1.

Specifically, the mechanism for moving the plunger to protrude out and retrograde back may be, for example, a self-retaining solenoid. The self-retaining solenoid is electrified only when the plunger is switched between a protruding state and a retrograding state, and the switched state is retained.

The start switch 23 is a switch operated by the driver when preparing the engine ready for initiation, initiating the engine or stopping the engine. The start switch 23 is a push-down switch disposed in the neighborhood of the steering wheel with a press portion thereof exposed out of the instrument panel. When the start switch 23 is pressed, a press operation signal is output to the electric power control unit 25 and the slot ECU 22.

The slot ECU 22 performs intercommunication with the electronic key 10. Specifically, the slot ECU 22 outputs a driving radio wave of predefined frequency (for example 125 kHz) into the slot 21 through the LF antenna 31. The electronic key 10 transmits a response signal containing a predefined recognition code after receiving the driving radio wave. The transmitted response signal is received by the LF antenna 31 and output to the slot ECU 22.

Further, the slot ECU 22 performs an electronic key authentication processing which electronically authenticate whether the electronic key 10 is a portable unit pre-registered in the vehicle 1. Specifically, the slot ECU 22 performs the intercommunication with the electronic key 10 inserted in the slot 21 as mentioned above to acquire a recognition code thereof. Thereafter, the slot ECU 22 performs authentication by checking the acquired recognition code with a pre-registered recognition code. If the authentication is valid (the recognition code is acquired in a given time and is matched with the registered recognition code), the slot ECU 22 outputs a valid authentication signal to the electric power control unit 25.

Furthermore, the slot ECU 22 includes as functions thereof a drive state detection unit 50 configured to sequentially detect a state of the electric steering lock ECU 29 and a portable-unit restraining control unit 51 configured to control the key locking unit 42 in accordance with a detection result by the drive state detection unit 50 when preparing the engine of the vehicle 1 ready for initiation.

When the engine of the vehicle 1 is prepared ready for initiation, the drive state detection unit 50 sequentially detects whether the electric steering lock ECU 29 is in the locked state (the steering wheel is locked and the vehicle 1 is drive-prohibited) or in the unlocked state (the steering wheel is unlocked and the vehicle 1 is drive-permitted).

The portable-unit restraining control unit 51 controls setting an on or off state for the key locking unit 42 in accordance with a detection result from the drive state detection unit 50. Specifically, the portable-unit restraining control unit 51 controls the key locking unit 42 by setting the key locking unit 42 to the on state (the plunger retrogrades from the key inserting space, the locking of the electronic key 10 is released and the electronic key 10 is removable) when the electric steering ECU 29 is in the locked state, and setting the key locking unit 42 to the off state (the plunger protrudes into the key inserting space, the electronic key 10 is locked, unable to be removed) when the electric steering ECU 29 is in the unlocked state.

The electrical power control 25 controls electrical power supplied to each component of the vehicle control system and outputs a control signal to each component. The fuse box 26 is connected to the electric power control unit 25 to prevent it from being excessively electrified.

The electrical power control unit 25 includes as a function thereof an initiation control unit 52 which enables the engine of the vehicle 1 ready for initiation when the authentication is valid according to the electronic key authentication processing. Specifically, the initiation control unit 52 outputs a lock releasing signal to the electric steering lock ECU 29, enabling the engine ready for initiation when receiving a valid authentication signal from the slot ECU 22. Thereafter, in the engine initiation ready state, if the initiation control unit 52 receives a pressing operation signal from the start switch 23 when a brake of the vehicle 1 is paddled (an engine initiation operation is performed), it outputs an engine initiation signal to the engine ECU 27.

When the engine is working, namely, when a complete explosion signal (to be described hereinafter) from the engine ECU 27 is input into the electric power control unit 25, if a pressing operation signal is input from the start switch 23 (an engine stop operation is performed), the electric power control unit 25 outputs an engine stop signal to the engine ECU 27, stops the electric power supply to the engine ECU 27 and outputs a lock signal to the electric steering lock ECU 29.

The electric steering lock ECU 29 controls the steering lock mechanism 34 of the vehicle 1 to select between a locked state and an unlocked state of the steering wheel according to the output from the electric power control unit 25. Then, the electric steering lock ECU 29 outputs whether the steering wheel is in the locked state or the unlocked state to the slot ECU 22.

In detail, the electric steering lock ECU 29 is provided with a constant voltage circuit 53 for converting a voltage of 0 to 12V supplied from the battery to a given voltage (for example, a constant voltage of 5V) and a steering control circuit 54 for controlling the steering lock mechanism 34, using the constant voltage supplied from the constant voltage circuit 53 as a driving voltage.

If a lock signal from the electric power control unit 25 is input into the steering control circuit 54, the steering control circuit 54 controls the steering lock mechanism 34 to disable the steering wheel operation of the vehicle 1 (locked state); while if a unlock signal from the electric power control unit 25 is input into the steering control circuit 54, the steering control circuit 54 controls the steering lock mechanism 34 to enable the steering wheel operation of the vehicle 1 (unlocked state). Since the steering control circuit 54 is operated by the constant voltage, the locked state and the unlocked state can be selected without being affected by the voltage variation of the battery or the like.

If the engine initiation signal is input from the electric control unit 25, the engine ECU 27 performs processing such as controlling fuel injection, or controlling ignition by controlling the start motor 28 (engine initiation processing). After the engine is initiated, the engine ECU 27 detects a driving state of the engine on the basis of an ignition pulse or an output from an alternator or the like; if it is determined that the engine is being driven, the engine ECU 27 outputs the complete explosion signal to the electric power control unit 25. The engine ECU 27 continues to output the complete explosion signal to the electric power control unit 25 while the engine is being driven. When the engine stop signal from the electric control unit 25 is input into the engine ECU 27, it performs a stop processing on the engine.

Although not shown in detail in the drawings, the slot ECU 22, the electric power control unit 25, the engine ECU 27 and the electric steering lock ECU 29 are electronic units composed of a computer (CPU, a memory such as a ROM or a RAM, a arithmetic processing circuit including an input circuit, an output circuit and the like, or a micro computer integrated with the mentioned functions) and the like which performs various arithmetic processing.

The functions of those electronic units are fulfilled through the computer to execute a program preliminarily installed in the memory of the computer. In addition, it is acceptable to store the program in the memory through a storage medium such as a CD-ROM. Moreover, it is acceptable that the program is distributed or broadcast from an external server through a network or a satellite, and stored in the memory after being received by a communication device mounted in the vehicle 1.

Figure 3:
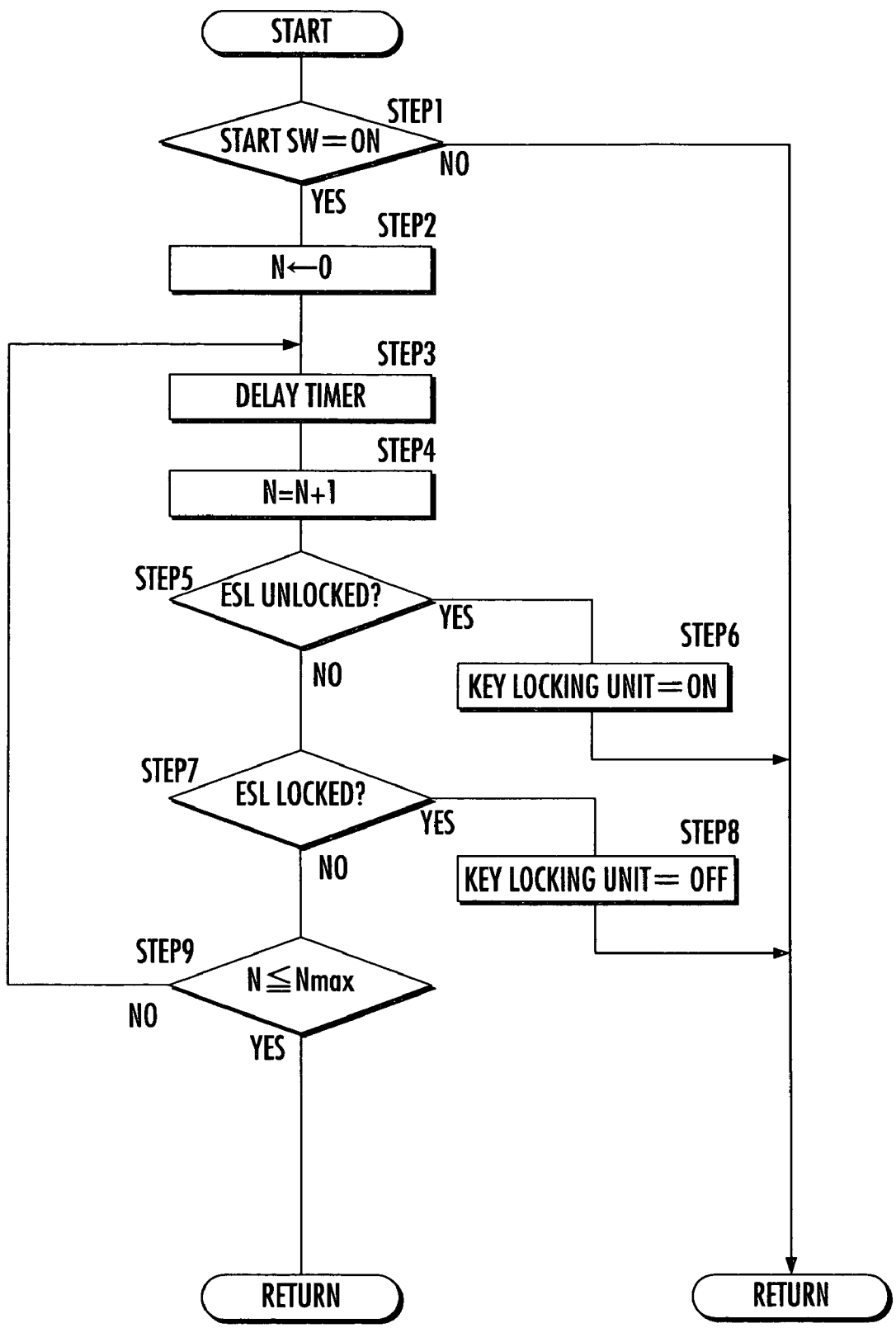
FIG. 3 is a flow chart illustrating a portable-unit restraining control processing performed by the vehicle control system illustrated in FIG. 1.

Hereinafter, an operation of the vehicle control system (portable-unit restraining control processing) fulfilled by the vehicle control device 20 of the present embodiment will be explained with reference to FIG. 3 to FIG. 5.

In brief, the vehicle control system respectively performs a initiation control processing, a driving controlling processing which controls the driving of the vehicle 1, a stop control processing which controls the stop of the vehicle 1, and the like. The initiation control processing which controls the initiation of the vehicle 1 according to communication with the electronic key 10, a state of a switch or the like operated by the driver, detection results from various sensors mounted in the vehicle 1, and the like. Moreover, together with the aforementioned processing, the vehicle control system performs a portable-unit restraining control processing which locks the electronic key 10 in the slot 21 and unlocks it from the slot 21 by controlling the key locking unit 42. The portable-unit restraining control processing is repeated periodically at a given control period with the initiation control processing and the like asynchronously.

Hereinafter, the portable-unit restraining control processing will be described according to the flow chart in FIG. 3. With reference to FIG. 3, first, the portable-unit restraining control unit 51 determines whether the start switch 23 is set at the on state or not (STEP 1). If the determination result in STEP 1 is "NO" (the start switch 23 is not pressed), the portable-unit restraining control processing is ended.

When the determination result in STEP 1 is "YES" (the start switch 23 is pressed), the portable-unit restraining control unit 51 sets a counter N to "0" as an initial value (STEP 2).

Subsequently, the portable-unit restraining control unit 51 stands by for a given interval according to a delay timer (STEP 3). After the given interval, the vehicle control device 20 increases the counter N to "1" (STEP 4).

Thereafter, the portable-unit restraining control unit 51 determines whether or not the electric steering lock ECU 29 is at the unlocked state on the basis of the detection result from the drive state detection unit 50 (STEP 5). IF the determination result in STEP 5 is "YES", the portable-unit restraining control unit 51 sets the key locking unit 42 to the on state (STEP 6). That is, the portable-unit restraining control unit 51 presses the plunger of the key locking unit 42 to enter the key inserting space to engage with the engagement recess of the electronic key 10. Thereafter, the portable-unit restraining control processing is ended.

If the determination result in STEP 5 is "NO", the portable-unit restraining control unit 51 determines whether the steering wheel is at the locked state or not (STEP 7). If the determination result in STEP 7 is "YES", the portable-unit restraining control unit 51 sets the key locking unit 42 to the off state (STEP 8). That is, the portable-unit restraining control unit 51 controls the key locking unit 42 so as to prevent the plunger thereof from being pressed, enabling the electronic key 10 to be inserted or removed by the driver. Thereafter, the portable-unit restraining control processing is ended.

If the determination result in STEP 7 is "NO", the vehicle control device 20 determines whether the counter N is not more than a predefined iteration number Nmax or not (STEP 9). If the determination result in STEP 9 is "NO", the process returns back to STEP 3 to repeat the processing from STEP 3 to STEP 9 until the determination result in STEP 9 is "YES".

If the determination result in STEP 9 is "YES", the portable-unit restraining control processing is ended. As mentioned above, the portable-unit restraining control processing has been described.

Hereinafter, the ON/OFF state of the key locking unit 42 (the lock and unlock of the electronic key 10) when each control processing of the vehicle control system is performed through the portable-unit restraining control processing will be described in detail.

Figure 4:
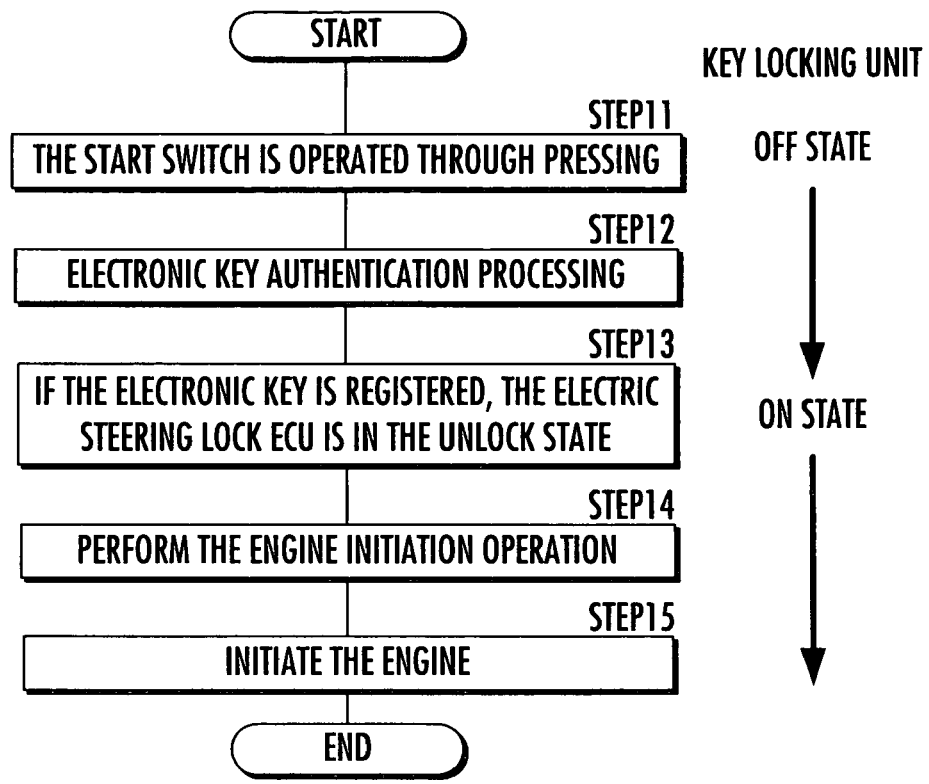
FIG. 4 illustrates a flow chart of an initiation control processing of the vehicle control system illustrated in FIG. 1 and an explanatory diagram showing states of a key locking unit.
Figure 5:
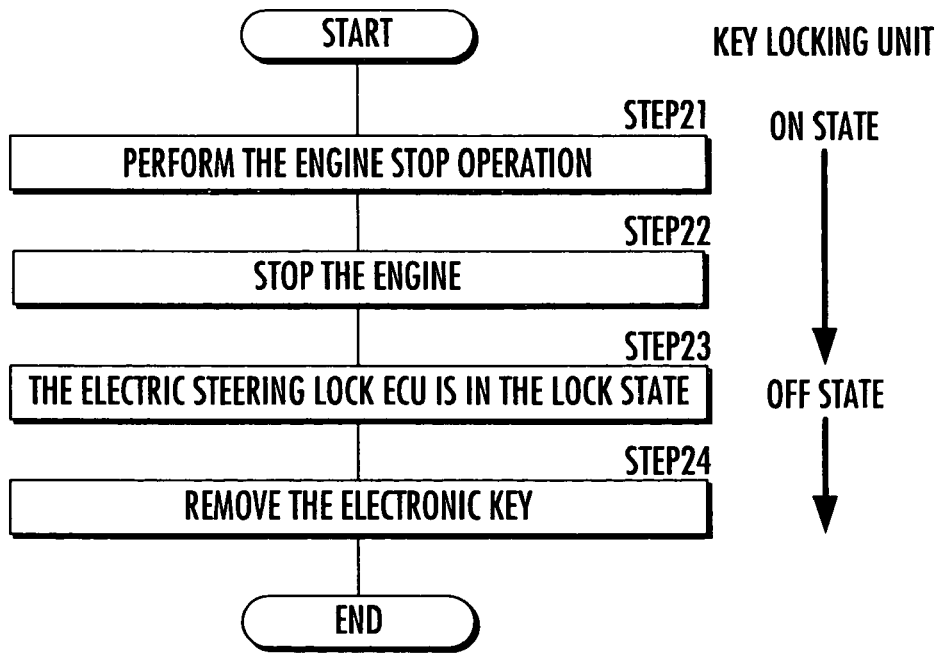
FIG. 5 illustrates a flow chart of a stop control processing of the vehicle control system illustrated in FIG. 1 and an explanatory diagram showing states of a key locking unit.

First, the state of the key locking unit 42 in the initiation control processing illustrated in the flow chart in FIG. 4 is described. Note that an initial state is set as a state where the vehicle 1 is in stop and the electric steering lock ECU 29 is at the locked state. Here, the electronic key 10 is inserted in the slot 21 by the driver and the start switch 23 has not been pressed. In the initial state, the key locking unit 42 is at the off state and the electronic key 10 can be inserted or removed.

In the initiation control processing as illustrated in FIG. 4, first, the start switch 23 is operated by the driver through pressing (STEP 11). Here, although the start switch 23 is at the on state in STEP 1 according to the above-mentioned portable-unit restraining control processing, since the electric steering lock ECU 29 is at the locked state, the determination result in STEP 7 is "YES" and the process proceeds to STEP 8, therefore, the key locking unit 42 is still maintained at the off state.

Thereafter, the vehicle control device 20 performs the electronic key authentication processing mentioned above (STEP 12). If the authentication is valid in STEP 12 (the electronic key 10 is a registered key), the vehicle control device 20 sets the electric steering lock ECU 29 to the unlocked state (STEP 13). Accordingly, the determination result in STEP 5 is "YES" in the above-mentioned portable-unit restraining control processing, the process proceeds to STEP 6 where the key locking unit 42 is set at the on state. Thereby, when the electric steering lock ECU 29 is at the unlocked state (drive-permitted state), it is highly probable that the vehicle 1 is in move, thus, the electronic key 10 is locked.

Next, the engine initiation operation is performed by the driver. That is, the start switch 23 is pressed while the brake is being paddled (STEP 14). Thereafter, the vehicle control device 20 performs the engine initiation processing (STEP 15) and ends the initiation control processing thereafter. In STEP 14 and STEP 15, since the electric steering lock ECU 29 is at the unlocked state when the start switch 23 is at the on state, thereby, the key locking unit 42 is maintained at the on state according to the aforementioned portable-unit restraining control processing in STEP 6.

Hereinafter, the state of the key locking unit 42 in the driving control processing will be described. When the vehicle 1 is in driving, since the electric steering lock ECU 29 is at the unlocked state when the start switch 23 is at the on state, thereby, the key locking unit 42 is maintained at the on state according to the aforementioned portable-unit restraining control processing in STEP 6.

Hereinafter, the state of the key locking unit 42 in the stop control processing illustrated in the flow chart in FIG. 5 will be described. As illustrated in FIG. 5, first, the engine stop operation is performed by the driver in the stop control processing. In other words, the start switch 23 is pressed when the engine is running (STEP 21). Then, the vehicle control device 20 performs the engine stop processing. In STEP 21 and STEP 22, since the electric steering lock ECU 29 is at the unlocked state when the start switch 23 is at the on state, thereby, the key locking unit 42 is maintained at the on state according to according to the aforementioned portable-unit restraining control processing in STEP 6.

Thereafter, the vehicle control device 20 sets the electric steering lock ECU 29 to the locked state. Accordingly, the determination result in STEP 7 in the above-mentioned portable-unit restraining control processing becomes "YES" and the process proceeds to STEP 8 where the key locking unit 42 is set at the off state. Thereby, when the electric steering lock ECU 29 is at the locked state (drive-prohibited state), it is highly probable that the vehicle 1 is not in a drive and the electronic key 10 should be removed out, and thus, the electronic key 10 is unlocked.

Thereby, the electronic key 10 is removed out of the slot 21 by the driver (STEP 24), and the stop control processing is ended.

According to the processing mentioned above, the electronic key 10 can be locked in the slot 21 and unlocked therefrom stably according to different situations.

Although in the present embodiment, the electronic key 10 is adopted as the portable unit; as another embodiment, it is also acceptable to adopt, for example, a mechanical key which can be used by simply inserting the mechanical key therein without the need to turn as the portable unit.

In the present embodiment, the electronic key 10 which has been inserted in the slot 21 is authenticated and the engine is possible to be initiated when the authentication is valid; however, as another embodiment, for example, it is also acceptable to combine a function in which the electronic key 10 is authenticated through wireless communication prior to be inserted into the slot 21 and the engine is possible to be initiated when the authentication is valid with the present embodiment.

In the present embodiment, the initiation of the engine is enabled and thereafter the engine is initiated by a single start switch 23; however, as another embodiment, it is also acceptable to provide independently a switch for preparing the engine ready for initiation and the other switch for initiating the engine.

In the present embodiment, the start switch is configured as a push button switch, the initiation of the engine is enabled or the engine is initiated after the push button is pressed; however, as another embodiment, for example, the start switch is a knob (a momentary push button switch), the initiation of the engine is enable when the knob is pressed and the engine is initiated when the knob is further rotated.

In the present embodiment, the initiation of the engine is enabled after the authentication processing when the start switch is pressed by the driver; however, as another embodiment, for example, the start switch is not provided, the initiation of the engine is enabled after the authentication processing is performed when the key-insertion detection switch 41 detects that the electronic key 10 is inserted in the slot 21.

In the present embodiment, the electric steering lock ECU 29 served as the steering lock unit is adopted as the drive permission unit; however, as another embodiment, it is also acceptable to adopt a shift lock unit which selects the locked state and the unlocked state of the shift lever of the vehicle 1 as the drive permission unit. A shift lock mechanism is configured to disable (locked state) the shift lever set at a parking position from being selected to the other position (for example, a reverse position, a neutral position, a drive position, a second position, a low position) when a movement prohibited signal is input. Further, the shift lock mechanism is configured to enable the shift lever (unlocked state) to be selected to either position when a movement permitted signal is input. As a drive-permitted unit, it is also acceptable to adopt the power steering unit which selects the locked state and the unlocked state of the steering wheel according to the power steering mechanism of the vehicle 1. Furthermore, it is acceptable to adopt a combination of the steering lock unit, the shift lock unit and the power steering unit.

In the present embodiment, the portable-unit restraining control unit restrains the portable unit and releases the restraint thereof by using the state of the drive permission unit; however, as another embodiment, for example, it is also acceptable that the portable-unit restraining control unit restrains the portable unit and releases the restraint thereof by further using other states related to the vehicle such as a state of electric power input related to the initiation of the engine or a combination of the state of the drive permission unit and the state of electric power input related to the initiation of the engine.

INDUSTRIAL APPLICABILITY

As mentioned above, the present invention provides a vehicle control device which allows a stable control on locking a portable unit such as an electronic key in a slot and releasing the locking when the portable unit enabling an initiation of an engine or the like is inserted into the slot, therefore, it is applicable in controlling a vehicle using the portable unit.

What is claimed is:
1. A vehicle control device including a slot provided in a vehicle where a portable unit is inserted and an initiation control unit which enables an initiation of a driving source provided in the vehicle when the portable unit is inserted in the slot, comprising:
a drive permission unit which is provided in the vehicle and is configured to select between a drive-permitted state in which the drive of the vehicle is permitted and a drive-prohibited state in which the drive of the vehicle is prohibited according to a given condition;

a drive state detection unit which is configured to sequentially detect which one of the drive-permitted state and the drive-prohibited state has been selected by the drive permission unit;

a portable-unit restraining unit which is configured to irremovably restrain the portable unit inserted in the slot; and a portable-unit restraining control unit which is configured to irremovably lock the portable unit in the slot through the portable-unit restraining unit if the portable unit is inserted in the slot in the drive-permitted state, and to release the portable unit locked in the slot by the portable-unit restraining unit to allow the portable unit to be removed from the slot if the portable unit is inserted in the slot in the drive-prohibited state.

2. The vehicle control device according to claim 1, wherein the drive permission unit is a steering lock unit configured to select between a locked state where a steering wheel of the vehicle is locked and an unlocked state where the steering wheel is unlocked; and the drive state detection unit is configured to detect the locked state selected by the steering lock unit as the drive-prohibited state and the unlocked state selected by the steering lock unit as the drive-permitted state.

3. The vehicle control device according to claim 1, wherein the drive permission unit is a shift lock unit configured to select between a locked state where a shift lever of the vehicle is locked and an unlocked state where the shift lever is unlocked; and the drive state detection unit is configured to detect the locked state selected by the shift lock unit as the drive-prohibited state and the unlocked state selected by the shift lock unit as the drive-permitted state.

4. The vehicle control device according to claim 1, wherein the drive permission unit is a power steering unit configured to assist the steering wheel of the vehicle in steering or to apply a load to the steering wheel; and the drive state detection unit is configured to detect a locked state where the steering wheel is locked due to a load equal to or greater than a given value applied by the power steering unit as the drive-prohibited state and an unlocked state where the steering wheel is unlocked without the load equal to or greater than the given value applied by the power steering unit as the drive-permitted state.

5. The vehicle control device according to claim 1, wherein the drive permission unit converts a voltage supplied from a battery mounted in the vehicle into a given voltage and operates at the given voltage.

6. The vehicle control device according to claim 2, wherein the drive permission unit converts a voltage supplied from a battery mounted in the vehicle into a given voltage and operates at the given voltage.

7. The vehicle control device according to claim 3, wherein the drive permission unit converts a voltage supplied from a battery mounted in the vehicle into a given voltage and operates at the given voltage.

8. The vehicle control device according to claim 4, wherein the drive permission unit converts a voltage supplied from a battery mounted in the vehicle into a given voltage and operates at the given voltage.

9. The vehicle control device according to claim 1, wherein the portable-unit restraining unit includes a plunger configured to protrude out and retrograde back inside the slot, and wherein the plunger is disposed at a location opposite to an engagement recess formed on a side surface of the portable unit when the portable unit is inserted in the slot.

10. The vehicle control device according to claim 1, further comprising a switch configured to be operated by the driver to start and stop an engine of the vehicle, and wherein the portable-unit restraining control unit performs the control process based on the detection result of the drive state detection unit after a predetermined standby interval which begins after the switch is operated.

11. The vehicle control device according to claim 1, wherein the portable-unit restraining control unit repeats a control process for a predetermined number of times in a case where the drive state detection unit fails to detect either of the drive-permitted state and the drive-prohibited stated.

* * * * *